June 30, 1964   J. E. OLSON ETAL   3,139,301
METHOD OF AND APPARATUS FOR HANDLING CARTONS
Filed Feb. 27, 1961   2 Sheets-Sheet 1

INVENTOR.
JOHN E. OLSON
ROBERT C. SHOEMAKER
BY
BUCKHORN, CHEATHAM & BLORE
ATTORNEYS

June 30, 1964  J. E. OLSON ETAL  3,139,301

METHOD OF AND APPARATUS FOR HANDLING CARTONS

Filed Feb. 27, 1961  2 Sheets-Sheet 2

INVENTOR.
JOHN E. OLSON
ROBERT C. SHOEMAKER
BY
BUCKHORN, CHEATHAM & BLORE

ATTORNEYS

United States Patent Office

3,139,301
Patented June 30, 1964

3,139,301
METHOD OF AND APPARATUS FOR
HANDLING CARTONS
John E. Olson and Robert C. Shoemaker, Portland, Oreg., assignors to Hyster Company, Portland, Oreg., a corporation of Nevada
Filed Feb. 27, 1961, Ser. No. 92,080
10 Claims. (Cl. 294—64)

This invention relates to a method of and apparatus for handling cartons.

In the past, cartons have been picked up individually or have been stacked on a pallet and the pallet picked up. Sometimes cartons have been tied together to facilitate handling.

The patent of Cushman 2,709,519 discloses the idea of unitizing packages by enclosing them in a heavy impervious cover and creating a subatmospheric pressure within the cover. This allows the packages to be handled as a unit.

A main object of the present invention is to provide a method of unitizing or consolidating cartons or packages which is simpler and less expensive than heretofore used.

A more specific object is to provide a method by which a plurality of cartons may be more readily handled comprising unitizing or consolidating cartons by arranging the cartons in a compact group and creating a subatmospheric pressure between the adjacent walls of the packages to cause the walls to temporarily adhere to one another.

Another object is to pick up cartons unitized as stated above by the use of suction means engaging certain of the exposed walls of the packages, and further to engage top wall portions in addition to side wall portions.

A further object is to provide an apparatus for carrying out the above methods.

Various other objects of the invention will be apparent from the following description taken in connection with the accompanying drawings wherein.

Figure 4:
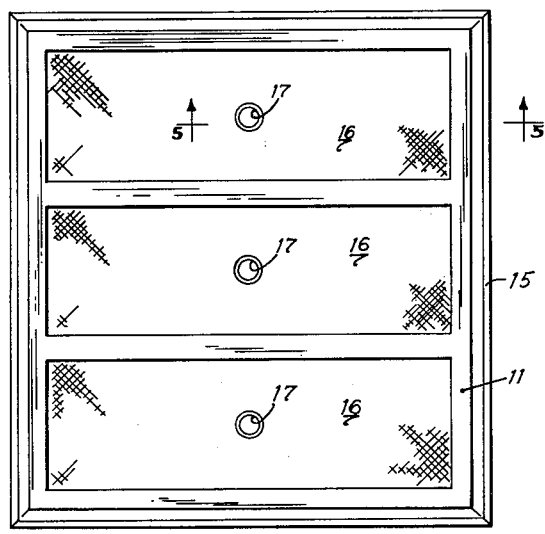
FIG. 4 shows an elevation of the vacuum head which is attached to the carriage of the lift truck.
Figure 5:
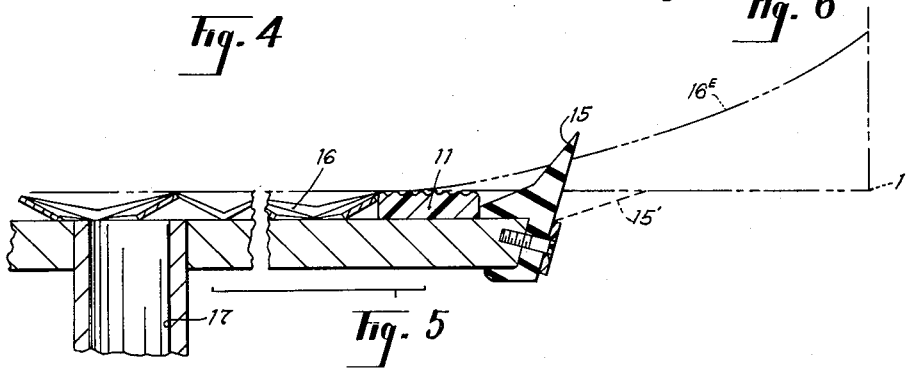
FIG. 5 shows an enlarged section on line 5—5 through the vacuum head of FIG. 4.

In a co-pending application of Donald A. Harris, Serial No. 761,218, now Patent No. 3,040,920, we have described a method of consolidating a number of packages by evacuating the inside of the packages after they have been wrapped in an impervious membrane. This method is satisfactory for certain types of package but is unsuitable for use on large cartons such as those commonly used for packing household appliances because the contents of the carton does not support the carton from the inside and even a slight vacuum in a carton of this type would cause the carton to collapse and be destroyed. If, however, a partial vacuum is drawn and maintained between the abutting faces of several cartons, these cartons will adhere together so that a group of them may be handled as a unit. All commercial cartons are so constructed that the inside is open to ambient atmospheric pressure so, if the pressure on the outside of any given face of the carton is reduced substantially below ambient, the atmospheric pressure within the carton will cause that face of the carton to distend outwardly. If a vacuum head as shown in FIGS. 4 and 5 and to be described later is constructed with a backing surface, the side of the carton will distend until it presses heavily against that surface and sufficient friction can be developed to permit the carton to be raised without slipping off the vacuum head.

Similarly, if the faces of two cartons be placed together, and a vacuum drawn between them, the two faces will be pushed together by the pressure inside the respective cartons with sufficient force to develop friction which will permit one carton to lift or support the other.

The material, be it corrugated board or simple pressed board, of which commercial cartons are manufactured has considerable tensile strength but has practically no bending strength. It is thus necessary, when picking up a heavy article like a washing machine which is surrounded by a carboard carton, to apply forces to the carton which the material of the carton can withstand. Thus it is apparent that we could not apply a simple vacuum head to the middle of the face of the carton in an attempt to pick the latter up because the moment of the load (as diagrammed in FIGS. 6 and 7) would subject the side of the carton to excessive bending stress which it is unable to withstand. Such bending not only tends to destroy the carton but also, as to be described, it increases the tendency of the carton to become detached from the suction head by the process known as "peeling off."

Figure 6:
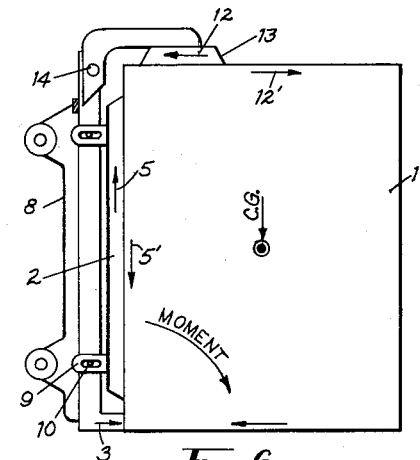
FIG. 6 is a view showing a carton supported on the carriage of a lift truck in accordance with the invention.
Figure 7:
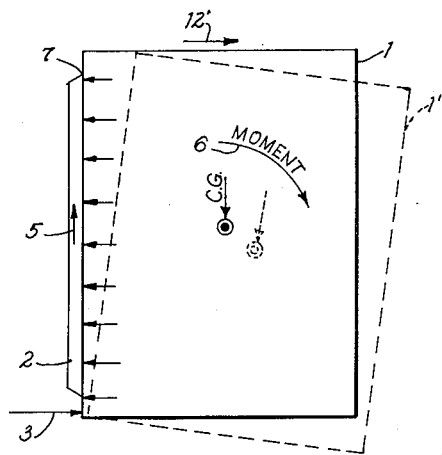
FIG. 7 shows diagrammatically the effect of attempting to support the package by a vacuum head applied to the back of the carton only.

With reference to FIGS. 6 and 7 it is apparent that carton 1 if supported by friction along the vertical face of suction head 2, tends to rotate in a clockwise direction about the lower fixed support 3. The frictional force 5 exerted on the face of the carton by the vacuum head 2 is a function of the difference in pressure between the ambient pressure on the inside of the carton and the evacuated pressure within the vacuum head. This force is diagrammatically shown in FIG. 7 as a series of arrows 4. The pressure over the entire area is uniform as depicted by the uniform length of the arrows. If the box is picked up in the manner shown in FIG. 7, it is apparent that in addition to developing the frictional force 5 it is necessary to develop a moment to keep the carton from "peeling off" the friction head by rotating about horizontal support 3 in the direction shown by arrow 6. If the side of the carton is flexible as is the case with cardboard cartons, it will distort and allow the entire package to assume the dotted position 1'. When the carboard face of the carton is no longer parallel to the face of the suction head, there is a tendency for the head and the carton to separate at the top of the head as shown at 7. This phenomenon is known as "peeling."

FIG. 6 shows a construction which prevents distortion of the carton and consequent peeling. Vacuum head 2 is supported on carriage 8 by slotted brackets 9 working in conjunction with pins 10 which are attached to the carriage. It is thus apparent that vacuum head 2 is unable to resist the moment load because it is free to assume the exact position of the vertical side of the carton wherever that may be within the limits of the slots. It is thus apparent that none of the moment load of the carton is transmitted to vertical vacuum head 2 so the resultant pressure of the carton against the friction surface 11 (FIGS. 4 and 5) is constant throughout the area of the vacuum head. If the vacuum head were allowed to develop moment force, the pressure between the side of the carton and the friction surface 11 would be reduced by an amount equal to the moment force so it would be necessary to draw a higher vacuum in order to develop sufficient frictional force 5 to keep the package from sliding off as the carriage 8 is raised, or breaking the vacuum altogether and falling off.

In order to develop the moment force 12, without subjecting any part of the carton to bending and consequent distortion and peeling, we provide a separate suction cup 13 which develops frictional force in the plane of the top of the carton. In order to prevent the upper vacuum head from peeling off the top of the carton or distorting the carton, it is mounted to the frame of the carriage on a pivot 14 in the plane of the top of the carton.

From the above it is apparent that we have provided a means for picking up a heavy load by the carton, without being required to insert forks under the carton and without subjecting any part of the carton to bending stress. All the stress in the carton is in the direction of the plane of the face of the carton to which attachment is made and these attachments are so designed that they cannot, even accidentally, subject the sides of the carton to bending stress.

The details of the vacuum head are shown in FIGS. 4 and 5 wherein 15 represents an elastomer gasket or fin which seals to the side of the carton by vacuum. A series of elastomer friction surfaces 11 is provided with the vacuum head as shown in FIG. 4 or, in extreme cases, friction surface may be provided over the entire area. In any case, these elastomer surfaces are serrated in at least two directions to admit the free passage of air between the multiple contact points of the surface. If conditions justify, we find it advisable to reduce the area of friction surface and fill the space between friction surfaces with expanded metal as shown at 16. The expanded metal prevents the side of the carton from contacting the back of the vacuum head and thus provides a free passage of air throughout the enclosure to the exhaust ports 17.

FIG. 5 also shows the position 15' assumed by elastomer lip 15 when the vacuum head is in contact with a carton and a vacuum is drawn. In a triple dot-dash line 16E is shown the effect of distortion of the carton when the side adjacent the vacuum head is subjected to bending. It is apparent that when this condition obtains, the vacuum is about to be broken and the package will drop.

Figure 1:
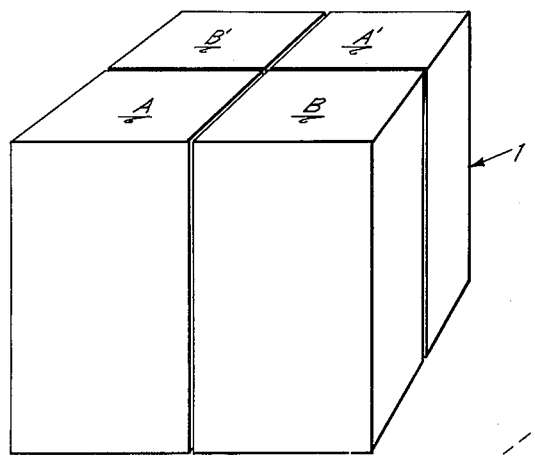
FIG. 1 is a perspective view of a unitized carton load of the present invention showing the surfaces of the respective cartons between which a vacuum is to be drawn.
Figure 2:
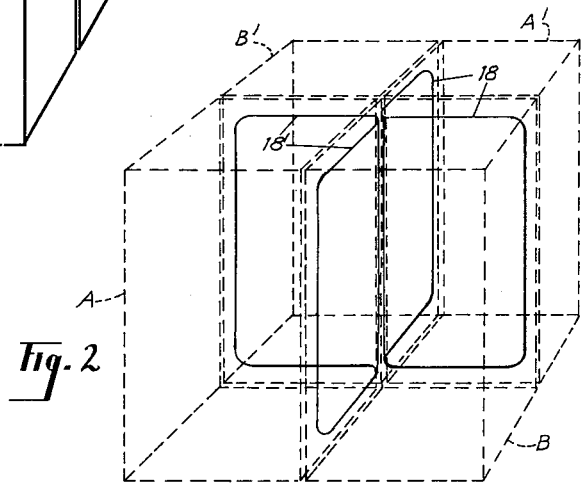
FIG. 2 is a schematic perspective view of the sealing fins mounted on certain faces of cartons A and A'.

Sometimes it is desirable to handle by the method described a number of cartons grouped together as shown in FIG. 1, for example. The same vacuum and apparatus that is used to pick up a single carton as shown in FIG. 6 can also be used to pick up a group of cartons by the application in appropriate positions of sealing lips at certain edges of some of the cartons. For this purpose we cement an elastomer lip, such as 18 (FIG. 3), around certain edges of the cartons to seal between the cartons in order that the vacuum created between the cartons will hold together with sufficient pressure to keep them from sliding on one another as the carriage is raised. In the example shown, four cartons are nested together. Two of these, designated A and A', have lips on two faces as shown schematically in FIG. 2 and the other two designated B and B' are plain with no lips attached.

Figure 3:
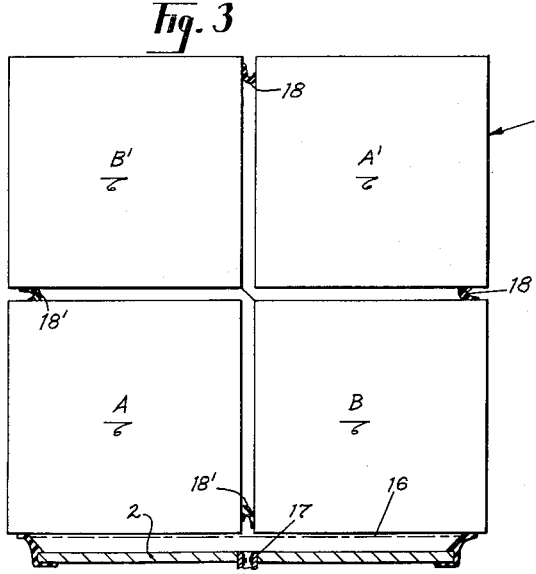
FIG. 3 is a horizontal cross sectional view of the cartons taken midway up the vertical sides of the cartons of FIG. 1, with the spaces between the cartons exaggerated to show the construction of the sealing fins, a vacuum head being added.

As will be seen from FIG. 3, air withdrawn from vacuum head 2 will be replaced by air from between the cartons through lip 18' which acts as a valve and will permit air to pass from the space between the cartons to the low pressure cavity within the vacuum head but will not permit air to pass the other way. Thus, ambient air on the outside of lip 18 cannot pass into the space or area or zone between the cartons.

The lips 18, are cemented to the extreme edges of cartons A and A' so as to reduce the peeling effect to a minimum. This arrangement is practical because the system provides for handling a number of identical cartons and therefore the sealing lips will come in the right places on the mating cartons. We have found that an upper vacuum head, corresponding to 13 is usually not required to hold the outer cartons against the inner cartons for two reasons:

(a) The separating force between outer cartons B' and A' and inner cartons A and B is only half the separating force developed between the inner cartons A and B and the vacuum head 2.

(b) The lips come at the exact corners of the cartons so the tendency to peel off is minimized as above stated.

While four cartons have been shown and discussed herein, the invention is obviously not limited to such specific number.

Having described the invention in what is considered to be the preferred embodiment thereof, it is desired that it be understood that the invention is not to be limited by the provisions of the following claims.

We claim:

1. The method of consolidating a plurality of cartons wherein the interiors of such cartons are and remain in communication with the atmosphere, comprising arranging the cartons in a closely grouped compact relationship with certain walls thereof in contiguous relationship, creating a subatmospheric pressure between such contiguous walls at certain opposed portions thereof, and preventing the admittance of atmospheric air to said certain opposed portions to maintain the subatmospheric pressure to cause such walls to adhere to one another because of the force of the atmospheric pressure in the cartons.

2. The method of consolidating a plurality of cartons, the interiors of which cartons are at atmospheric pressure, comprising arranging the cartons in a closely grouped compact relationship with certain walls thereof in contiguous relationship, sealing off the spaces between such contiguous walls to provide a sealed area, creating a subatmospheric pressure in the sealed area to cause such contiguous walls to adhere to one another because of the force of the atmospheric pressure in the cartons.

3. The method of consolidating a plurality of cartons, the interior of each of which is in communication with the atmosphere, comprising arranging the cartons in a closely grouped compact relationship with certain walls thereof in contiguous relationship, providing a seal between such contiguous walls adjacent the edges thereof to provide a sealed area, creating a subatmospheric pressure in such sealed area to cause such contiguous walls to adhere to one another because of the force of the atmospheric pressure in the cartons.

4. The method of picking up a plurality of separate cartons wherein the interiors of such cartons are and remain in communication with the atmosphere, comprising arranging the cartons in a closely grouped compact relationship with certain walls thereof in contiguous relationship, creating a subatmospheric pressure between such contiguous walls at certain opposed portions thereof, and preventing admittance of atmospheric air to said certain opposed portions to maintain the subatmospheric pressure to cause such walls to adhere to one another because of the force of the atmospheric pressure in the cartons, then picking up said cartons by a force applied to certain exposed surfaces of the consolidated cartons.

5. The method of picking up a plurality of separate cartons wherein the interiors of such cartons are and remain in communication with the atmosphere, comprising arranging the cartons in a closely grouped compact relationship at least two deep in any horizontal direction and with certain walls thereof in contiguous relationship providing a seal between such contiguous walls locally of the edges thereof to provide a sealed zone creating a subatmospheric pressure between such contiguous walls in said sealed zone to cause said walls to adhere to one another because of the force of the atmospheric pressure in the cartons, creating a subatmospheric pressure against certain of the exposed walls of only certain of the cartons and imparting a lifting force to the last-mentioned walls through the medium of the last-mentioned subatmospheric pressure to pick up all of the cartons.

6. The method of picking up a plurality of separate cartons wherein the interiors of such cartons are and remain in communication with the atmosphere, comprising arranging the cartons in a closely grouped compact relationship with certain walls thereof in contiguous relationship, creating a seal between such contiguous walls locally of the edges thereof to provide a sealed zone, creating a subatmospheric pressure between such contiguous walls in said sealed zone to cause such walls to adhere to one another because of the force of the atmospheric pressure in the cartons, creating a subatmospheric pressure against certain of the exposed vertical walls of the cartons and imparting a lifting force to the last-mentioned walls through the medium of the last-mentioned subatmospheric pressure, creating a subatmospheric pressure against at least certain portions of the upwardly facing walls of the cartons and through the medium of the last-named subatmospheric pressure restraining movement of the last-named walls in a plane parallel to such walls.

7. A vacuum type apparatus for picking up a carton load, comprising a support, vertical suction means for engaging a vertical wall of such carton load, means mounting said suction means on said support for pivotal movement about a horizontal axis located at the lower end of said suction means, a horizontal suction means for engaging the top wall of said carton load, and mounting means mounting said horizontal suction means on said support in a manner permitting said horizontal suction means to move vertically but not horizontally to enable said horizontal suction means to take horizontal thrust forces.

8. A plurality of cartons arranged in a compact closely grouped relationship with certain walls disposed in contiguous relationship, the interior of each carton being at atmospheric pressure, the walls of said cartons impeding the passage of air therethrough, and continuous sealing strip means disposed between said certain walls adjacent the edges thereof and in contact with such walls, said continuous strip sealing means being secured to one only of each pair of opposed walls of said certain walls to provide for ready physical separation of said cartons but to provide a sealed area so that when said sealed area is at subatmospheric pressure said certain walls will adhere to one another to enable the cartons to be handled as a unit, but when said sealed area is at atmospheric pressure the cartons may be readily separated.

9. A plurality of cartons arranged in a compact closely grouped relationship with certain walls disposed in contiguous relationship, the interior of each carton being at atmospheric pressure, the walls of said cartons impeding the passage of air therethrough, and continuous sealing strip means disposed between said certain walls adjacent the edges thereof and in contact with such walls, said continuous strip sealing means being secured to one only of each pair of opposed walls of said certain walls to provide for ready physical separation of said cartons but to provide a sealed area so that when said sealed area is at subatmospheric pressure the said certain walls will adhere to one another to enable the cartons to be handled as a unit, but when said sealed area is at atmospheric pressure the cartons may be readily separated, said sealing strip means being constructed to open outwardly under the influence of an outwardly lower differential pressure but to close under the influence of an outwardly higher differential pressure whereby a suction head can be applied to said cartons at any of certain meeting planes thereof to withdraw air from said sealed area.

10. The method of picking up a plurality of separate cartons wherein the interiors of such cartons are and remain in communication with the atmosphere, comprising arranging the cartons in a closely grouped compact relationship with certain walls thereof in contiguous relationship, providing a seal between such contiguous walls adjacent the edges thereof to provide a sealed zone wherein the seal prevents ingress of air into the zone but allows egress of air from the zone, placing a suction head against said plural cartons in a position to extend across at least one crevice between two of the cartons, creating a subatmospheric pressure in said suction head to thereby withdraw air from within said sealed zone and create a subatmospheric pressure therein, and lifting said suction head while maintaining the subatmospheric pressure therein to lift said cartons.

References Cited in the file of this patent

UNITED STATES PATENTS

| | | |
|---|---|---|
| 2,035,340 | Primavera | Mar. 24, 1936 |
| 2,709,519 | Cushman | May 31, 1955 |
| 2,841,433 | Pagdin et al. | July 1, 1958 |
| 2,893,581 | Cushman | July 7, 1959 |
| 2,942,745 | Horton | June 28, 1960 |